(12) United States Patent
Bhagath et al.

(10) Patent No.: US 9,022,700 B2
(45) Date of Patent: May 5, 2015

(54) CUTTING INSERT AND CUTTING TOOL

(71) Applicant: Tungaloy Corporation, Iwaki-shi, Fukushima (JP)

(72) Inventors: Kedar Suresh Bhagath, Iwaki (JP); Takashi Yamaguchi, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 360 days.

(21) Appl. No.: 13/743,059

(22) Filed: Jan. 16, 2013

(65) Prior Publication Data

US 2013/0129430 A1 May 23, 2013

Related U.S. Application Data

(63) Continuation-in-part of application No. PCT/JP2011/072111, filed on Sep. 27, 2011.

(30) Foreign Application Priority Data

Sep. 27, 2010 (JP) ................ 2010-214801

(51) Int. Cl.
*B23C 5/20* (2006.01)
*B23B 27/00* (2006.01)
(Continued)

(52) U.S. Cl.
CPC .......... *B23C 5/207* (2013.01); *Y10T 407/2268* (2015.01); *Y10T 407/1906* (2015.01);
(Continued)

(58) Field of Classification Search
CPC .. B23B 27/16; B23B 27/164; B23B 27/1651; B23B 2200/0404; B23B 2200/0438; B23B 2200/0447; B23C 2200/0405; B23C 2200/0422; B23C 2200/0433; B23C 2200/201; B23C 2200/208; B23C 2210/082
USPC .................................... 407/113, 42
See application file for complete search history.

(56) References Cited

U.S. PATENT DOCUMENTS 3,289,271 A 12/1966 Stier
6,733,212 B2 * 5/2004 Nagaya et al. .............. 407/34
(Continued)

FOREIGN PATENT DOCUMENTS

JP 08243829 A * 9/1996
JP 2004314301 A * 11/2004
(Continued)

OTHER PUBLICATIONS

Machine Translation of JP 2009-286864 which is equivalent to JP 2010-142948 A, pp. 1-7, Feb. 17, 2015.*
(Continued)

*Primary Examiner* — Daniel Howell
*Assistant Examiner* — Nicole N Ramos
(74) *Attorney, Agent, or Firm* — Womble Carlyle

(57) ABSTRACT

A cutting insert is provided with a plurality of cutting portions formed at the intersection portion of each end surface and a peripheral surface. Each cutting portion includes first and second cutting edges. First corners and second corners which differ in their internal angles are alternately formed in each end surface. An internal angle of the first corner is smaller than an internal angle of the second corner. Each first cutting edge has a portion extending to approach the median plane as a distance from a corresponding first corner increases. A first side surface portion extending on the peripheral surface from each first cutting edge forms an insert internal obtuse angle, and a second side surface portion extending on the peripheral surface from each second cutting edge forms an insert internal acute angle.

13 Claims, 22 Drawing Sheets

(51) Int. Cl.
*B23B 27/14* (2006.01)
*B23C 5/06* (2006.01)
*B23B 27/16* (2006.01)

(52) U.S. Cl.
CPC .............. *Y10T407/23* (2015.01); *Y10T 407/22* (2015.01); *B23C 2200/201* (2013.01); B23B 27/007 (2013.01); B23B 27/145 (2013.01); *B23B 2200/0409* (2013.01); *B23B 2200/0447* (2013.01); *B23B 2200/202* (2013.01); *B23B 2200/204* (2013.01); B23C 5/06 (2013.01); *B23C 2200/0444* (2013.01); *B23C 2200/125* (2013.01); *B23C 2200/203* (2013.01); *B23C 2200/205* (2013.01); *B23C 2200/208* (2013.01); B23B 27/1607 (2013.01); B23B 27/1611 (2013.01); B23C 5/205 (2013.01)

(56) References Cited

U.S. PATENT DOCUMENTS

| | | | | |
|---|---|---|---|---|
| 7,604,441 | B2 * | 10/2009 | Bhagath | 407/113 |
| 8,573,905 | B2 * | 11/2013 | Hecht | 407/113 |
| 2007/0003384 | A1 | 1/2007 | Smilovici et al. | |
| 2007/0071559 | A1 * | 3/2007 | Koskinen | 407/34 |
| 2008/0232912 | A1 * | 9/2008 | Bhagath | 407/114 |
| 2011/0135407 | A1 * | 6/2011 | Koga | 407/40 |
| 2012/0093596 | A1 * | 4/2012 | Ishi | 407/113 |
| 2012/0275868 | A1 * | 11/2012 | Saito et al. | 407/42 |

FOREIGN PATENT DOCUMENTS

| | | | |
|---|---|---|---|
| JP | 2007021622 A | * | 2/2007 |
| JP | 2009274207 A | * | 11/2009 |
| JP | 2010142948 A | * | 7/2010 |
| WO | WO 2008/120186 A1 | | 10/2008 |
| WO | WO 2008/120188 A2 | | 10/2008 |

OTHER PUBLICATIONS

International Search Report dated Nov. 8, 2011 issued in PCT counterpart application (No. PCT/JP2011/072111).

International Preliminary Report on Patentability (IPRP) dated Apr. 11, 2013 issued in PCT counterpart application (No. PCT/JP2011/027111) with translation.

* cited by examiner

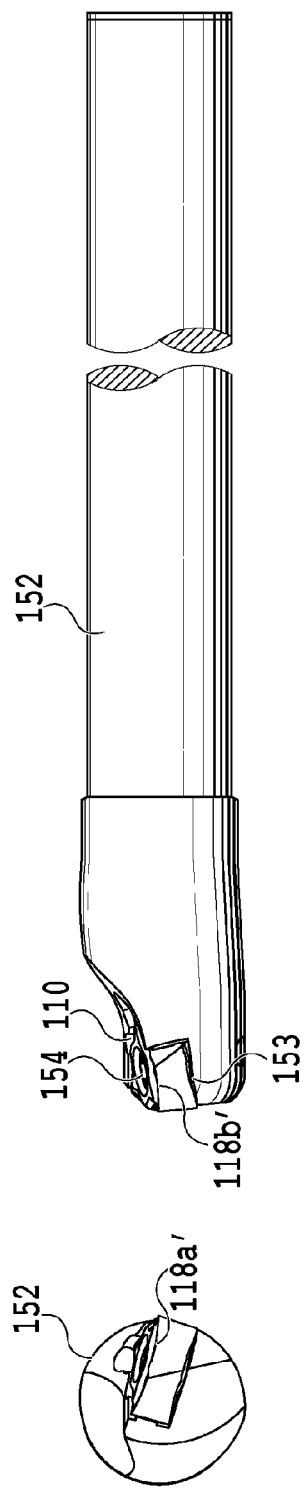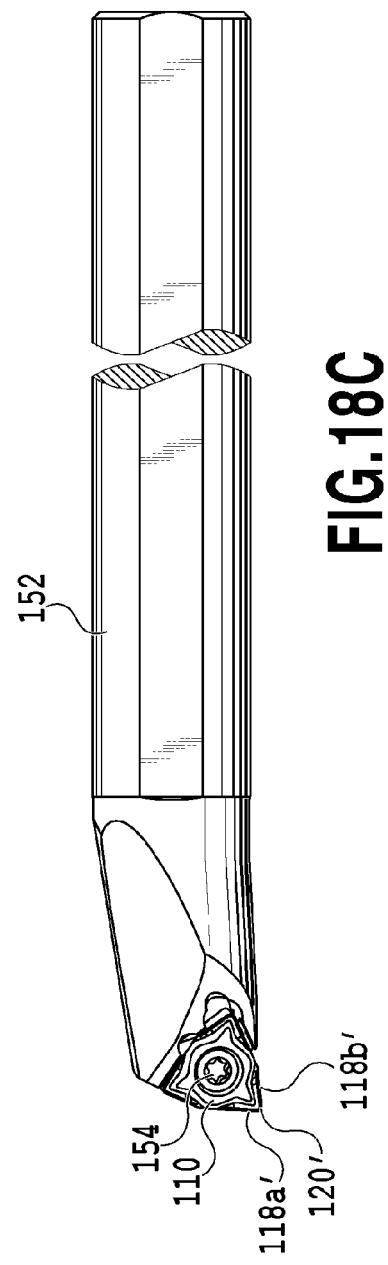

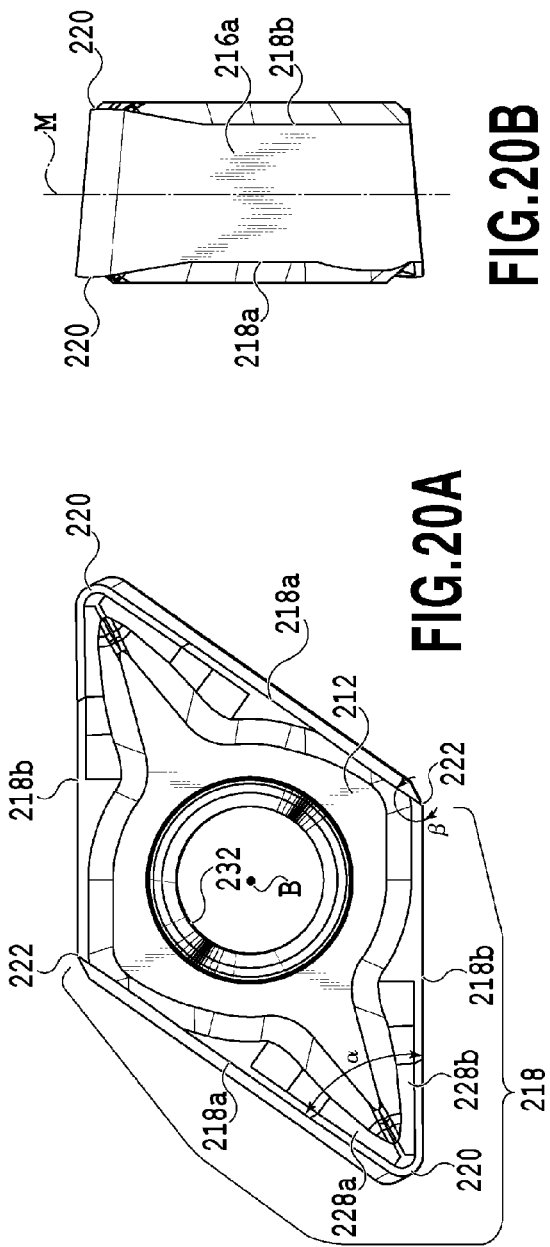
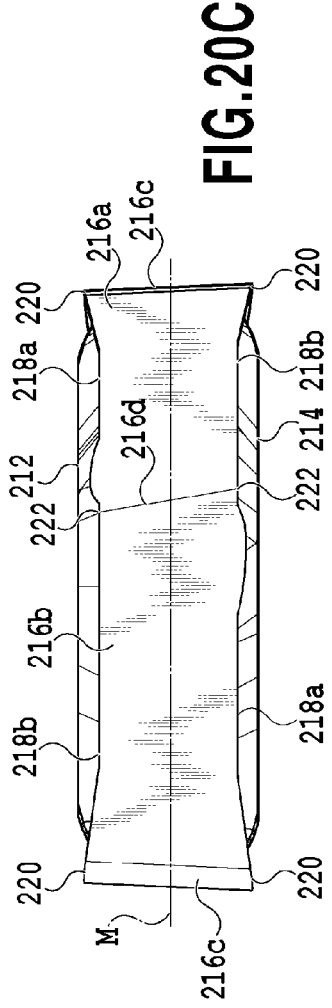
FIG.20A
FIG.20B
FIG.20C

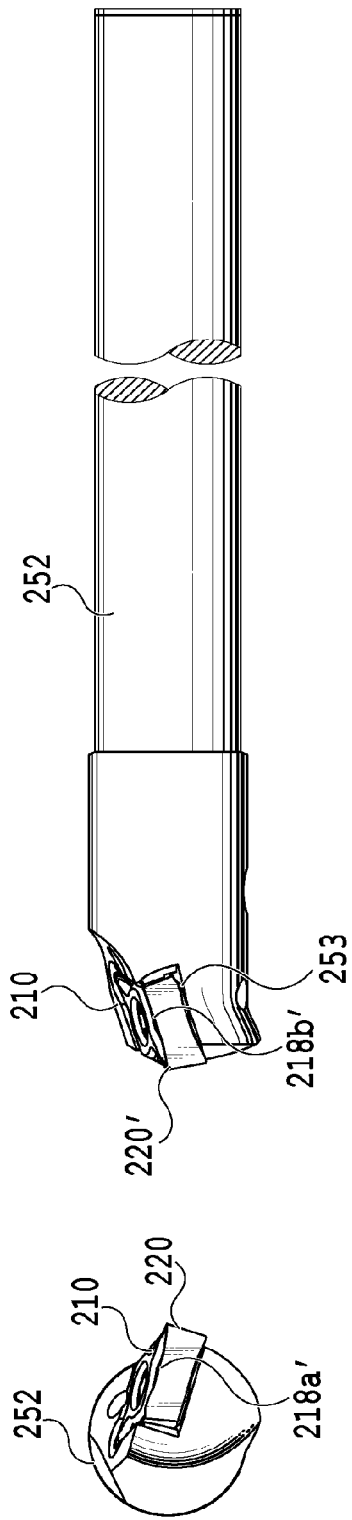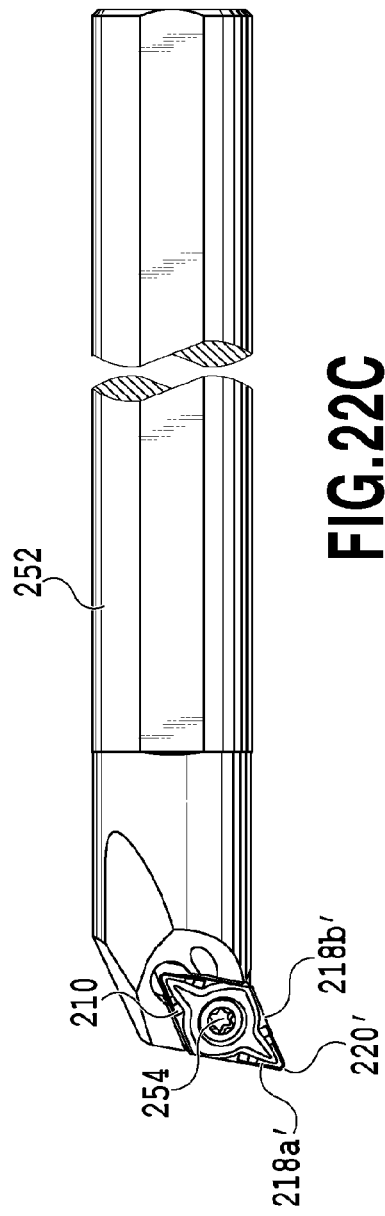

CUTTING INSERT AND CUTTING TOOL

CROSS-REFERENCE TO RELATED APPLICATIONS

This application is a continuation-in-part of PCT application No. PCT/JP2011/072111 filed Sep. 27, 2011, which published as WO 2012/043579A1 and claims the benefit of Japanese Patent Application No. 2010-214801, filed Sep. 27, 2010. The contents of the aforementioned applications are incorporated by reference in their entirety.

BACKGROUND OF THE INVENTION

1. Field of the Invention

The present invention relates to a cutting insert and a cutting tool, and particularly, to a cutting insert used in an indexable cutting tool and a cutting tool in which the cutting insert is detachably mounted on a tool body.

2. Description of the Related Art

An example of a cutting insert and a cutting tool is disclosed in WO2008/120186. The cutting insert mounted on a tool body described in WO2008/120186 is formed in a substantially hexagonal plate shape, and is equipped with two same opposing end surfaces and a peripheral surface extending therebetween. In the cutting insert, a cutting edge is formed at the intersection portion or the intersecting ridge portion between the end surface and the peripheral surface. The same cutting portions are formed respectively between three particular corners of each end surface, and each cutting portion includes a major cutting edge and a minor cutting edge. Each of the three particular corners has an internal obtuse angle, which is 102.5° according to the description of WO2008/120186. A major rake surface related to each major cutting edge and a minor rake surface related to each minor cutting edge extend on each end surface. A major flank surface related to each major cutting edge and a minor flank surface related to each minor cutting edge extend on the peripheral surface. The major flank surface extending from the major cutting edge of one end surface is formed to be integral with the minor flank surface extending from the minor cutting edge of the other end surface. In the cutting insert, as a plane located medianly between both the end surfaces in such a manner as to bisect the cutting insert is defined as a median plane, each of the major flank surfaces forms an insert internal obtuse angle to a plane passing through the corresponding major cutting edge and being in parallel to the median plane. On the other hand, each of the minor flank surfaces forms an insert internal acute angle to a plane passing through the corresponding minor cutting edge and being in parallel to the median plane. Such a cutting insert in WO2008/120186 and the cutting tool equipped with this cutting insert are a cutting insert used for a so-called high feeding cutter, and the high feeding cutter. Therefore in the cutting tool of WO2008/120186, one corner different from the corners of the cutting insert mounted to the tool body each having a larger angle, that is, the above particular corners is positioned in the leading end of the cutting tool, and a cutting edge angle at the time of using the cutting tool is small. Referring to the figure of WO2008/120186, the cutting edge angle in the cutting tool is approximately 20°.

In addition, WO2008/120188 discloses a different cutting insert and a different cutting tool. The cutting insert mounted on a tool body described in WO2008/120188 is formed in a substantially pentagonal plate shape, and is equipped with two opposing end surfaces and a peripheral surface extending therebetween. In the cutting insert, as a plane located medianly between both the end surfaces in such a manner as to bisect the cutting insert is defined as a median plane, a cutting region including a cutting edge related to one vertex portion of the pentagon and the periphery is uplifted in such a manner as to separate from the median plane. Therefore the major cutting edge and the minor cutting edge in the same cutting region are each inclined to approximately gradually become closer to the median plane as a distance from the common vertex portion increases. A cutting tool on which the cutting insert of WO2008/120188 is mounted is also a so-called high feeding cutter, and the cutting edge angle at the time of using the cutting tool is small.

The cutting inserts and the cutting tools in WO2008/120186 and WO2008/120188 are devised for so-called high feeding cutters. Therefore even in any of the cutting tools, the cutting edge angle is small and a length of the operative major cutting edge in the rotational axis direction of the rotational cutting tool is very short. Accordingly the cutting inserts and the cutting tools described in WO2008/120186 and WO2008/120188 are inappropriate for deep cutting.

On the other hand, in a face mill as a rotational cutting tool capable of performing plane processing at a cutting edge angle of 45° or more, as a cutting insert having cutting edges in both end surfaces, there is generally used a cutting insert in which an angle between the end surface and the peripheral surface is made substantially as a right angle, that is, a so-called negative type of cutting insert. When this negative type of cutting insert is mounted on the tool body, for ensuring a clearance angle in a tool rotational axis direction (axial direction), the cutting insert is arranged on the tool body in such a manner that a negative rake angle is given in the axial direction as a whole. Therefore for ensuring an axial rake angle as the cutting tool to a positive angle, it is required to provide an uplifted portion on the rake surface of the cutting insert, that is, the end surface. In this way, this cutting insert has the limitation to setting the axial rake angle, and is generally inappropriate for making deep cuts. It should be noted that the cutting insert in WO2008/120188 is a so-called negative type of cutting insert.

SUMMARY OF THE INVENTION

The present invention has an object of providing a cutting insert and a cutting tool which can be applied to cutting at a deep cut.

According to an aspect of the present invention, there is provided a cutting insert comprising:

two opposing end surfaces;

a peripheral surface extending between the two end surfaces; and a peripheral edge formed at the intersection portion of each end surface and the peripheral surface, the peripheral edge including a plurality of cutting portions, each of the cutting portions including a first cutting edge and a second cutting edge; wherein in an end surface view of the cutting insert, first corners and second corners are alternately formed in each end surface, the first corner having an internal corner angle that is smaller than an internal corner angle of the second corner;

each cutting portion is located between two adjacent second corners, and in each cutting portion, the first cutting edge and the second cutting edge extend from the common first corner in different directions;

a median plane between the two end surfaces is defined so as to bisect the cutting insert;

each first cutting edge has a portion extending so as to become closer to the median plane as a distance from a corresponding first corner increases;

a first side surface portion extending on the peripheral surface from each first cutting edge has a portion forming an insert internal obtuse angle to a plane passing through the first cutting edge and being parallel to the median plane; and a second side surface portion extending on the peripheral surface from each second cutting edge has a portion forming an insert internal acute angle to a plane passing through the second cutting edge and being parallel to the median plane.

Preferably the insert internal acute angle is within the range which is 65° or larger and which is 88° or smaller.

Preferably the internal corner angle of the second corner is within the range which is 153° or larger and which is 179° or smaller.

Preferably the internal corner angle of the first corner is within the range which is 110° or larger and which is smaller than 135°.

Preferably in an end surface view of the cutting insert, a ratio of a length of the first cutting edge to a length of the second cutting edge is within a range from 4:1 to 5:2, including 4:1 and 5:2. More preferably in the end surface view of the cutting insert, the ratio of the length of the first cutting edge to the length of the second cutting edge is approximately 3:1.

Preferably each first side surface portion related to one end surface of the two end surfaces is on the same plane as a corresponding second side surface portion related to the other end surface of the two end surfaces.

Preferably in an end surface view of the cutting insert, each end surface has a substantially polygonal shape so as to be formed by ten or more even number sides. For example, a cross-sectional shape of the cutting insert in the median plane can be a substantially regular decagon.

In addition, according to another aspect of the present invention, there is provided a cutting tool comprising: a tool body; and at least one insert seat formed in the tool body, the insert seat being configured to mount the cutting insert as described above. Preferably the cutting tool is a rotary cutting tool.

Preferably in the cutting insert mounted on the tool body, each of first and second end surface portions extending from operative first and second cutting edges on one related end surface acts as a rake surface, and each of first and second side surface portions extending from the operative first and second cutting edges acts as a flank surface.

Preferably in the cutting insert mounted on the tool body, an operative first cutting edge acts as a major cutting edge, and an operative second cutting edge acts as a finishing edge.

According to the present invention, when the cutting insert is mounted on the tool body, the positive axial rake angle can be appropriately obtained, and also the large cutting edge angle can be obtained. Therefore the cutting insert and the cutting tool according to the present invention enable the cutting at the deep cut.

These and further features of the present invention will become apparent from the following description of exemplary embodiments (with reference to the attached drawings).

BRIEF DESCRIPTION OF THE DRAWINGS

FIG. 18A is a front view of the boring tool shown in FIG. 17;

FIG. 18B is a right side view of the boring tool shown in FIG. 17;

FIG. 18C is a plan view of the boring tool shown in FIG. 17;

FIG. 20A is a plan view of the cutting insert shown in FIG. 19;

FIG. 20B is a right side view of the cutting insert shown in FIG. 20A;

FIG. 20C is a front view of the cutting insert shown in FIG. 20A;

FIG. 22A is a front view of the boring tool shown in FIG. 21;

FIG. 22B is a right side view of the boring tool shown in FIG. 21; and

FIG. 22C is a plan view of the boring tool shown in FIG. 21.

DETAILED DESCRIPTION

Figure 1:
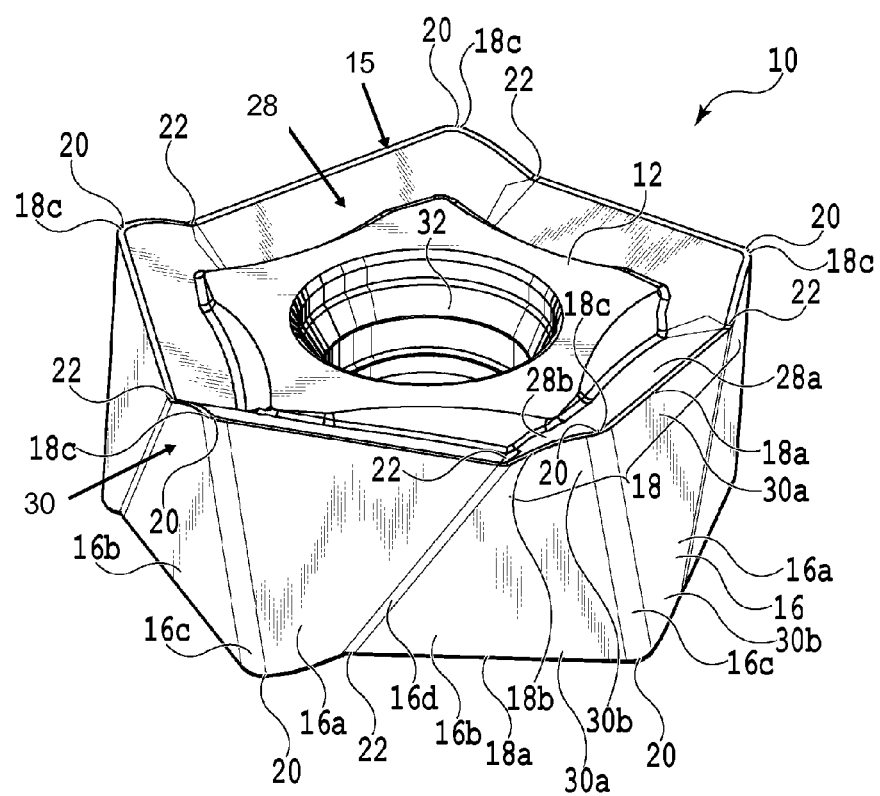
FIG. 1 is a perspective view of a cutting insert according to a first embodiment in the present invention.

An explanation will be made of embodiments in the present invention with reference to the drawings.

A first embodiment will be explained with reference to FIG. 1 to FIG. 14. A cutting insert 10 in the first embodiment is illustrated in FIG. 1 to FIG. 8.

The cutting insert 10 according to the first embodiment in the present invention is configured as an insert for a milling cutter among rotational cutting tools. The cutting insert 10 comprises two end surfaces 12 and 14 opposing with each other, that is, facing in the opposite directions, and a peripheral surface 16 extending therebetween. In the cutting insert 10 in the first embodiment, the two end surfaces are identical with each other and are formed in the same shape, but one or more different portions may be configured in the end surfaces 12 and 14. For example, any one or both of the two end surfaces 12 and 14 may have marks for identification. Here, for easy explanation, one end surface 12 is called an upper surface or a first end surface and the other end surface 14 is called a lower surface or a second end surface, but the relationship therebetween may be reversed.

A peripheral edge 15 is formed at the intersection portion or the intersecting ridge portion between each of the end surfaces 12 and 14, and the peripheral surface 16. The peripheral edge 15 is segmented into a plurality of cutting portions 18. Here the plurality of cutting portions 18 are sequentially connected with each other, but may be formed to be independent (i.e., space apart) from one another.

Figure 2:
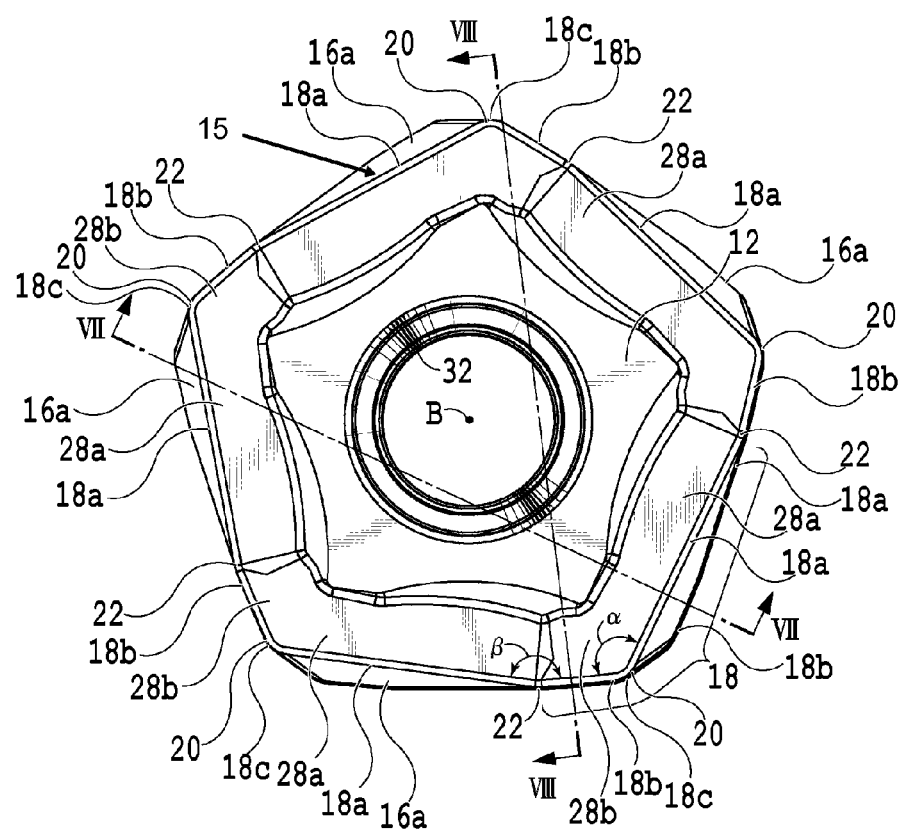
FIG. 2 is a plan view of the cutting insert shown in FIG. 1.
Figure 4:
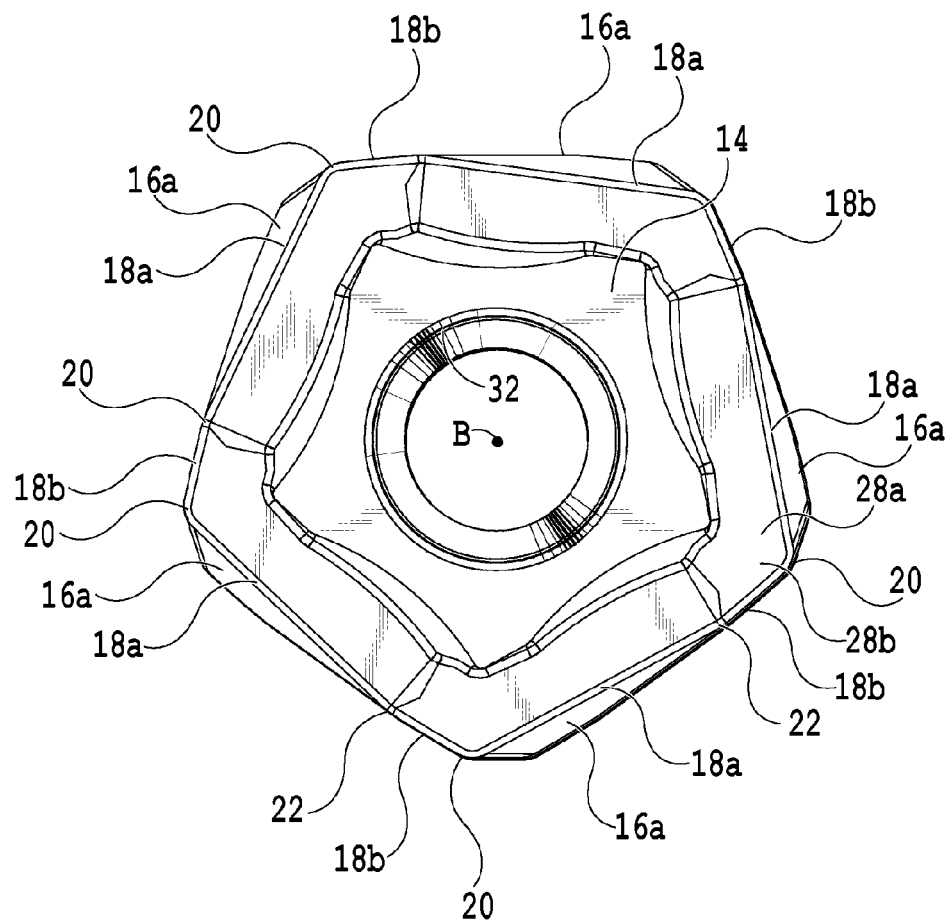
FIG. 4 is a bottom view of the cutting insert shown in FIG. 2.

As shown in FIG. 1 or FIG. 2, the cutting insert 10 is formed in a substantially decagonal plate shape. In an end surface view of the cutting insert 10 as shown in FIG. 2 and FIG. 4, two kinds of corners 20 and 22 having different intersection angles between two adjacent sides, that is, different internal corner angles $\alpha$ and $\beta$ are formed alternately in each of the upper surface 12 and the lower surface 14. Here, for easy explanation, one corner 20 is called a first corner and the other corner 22 is called a second corner. Relative to a median plane M (described below), the first corners 20 are further from the median plane M in the axial direction of the insert than the second corners 22. Therefore, the first corners 20 may also be called raised corners 20, while the second corners 22 may be called lowered corners. Thus, in this embodiment, raised corners 22 and lowered corners 22 alternate in the circumferential direction on each of upper and lower surfaces 12, 14. The internal corner angle $\alpha$ of the first corner 20 is formed to be smaller than the internal corner angle $\beta$ of the second corner 22. The internal corner angle $\alpha$ of the first corner 20 and the internal corner angle $\beta$ of the second corner 22 have a mutual dependence relation.

In FIG. 2, that is, in the end surface view, the internal angle $\beta$ of the second corner 22 may be preferably set within a range which is 153° or larger and which is 179° or smaller, preferably within a range which is 160° or larger and which is 170° or smaller. One of the reasons that the internal corner angle $\beta$ of the second corner 22 is preferably set to 153° or more, is that the internal corner angle $\alpha$ of the first corner 20 is made smaller to some degree in such a manner as to be capable of obtaining a sufficiently large cutting edge angle at the time the cutting insert 10 is mounted on the tool body. For example, in order to realize the cutting edge angle of 45° or the like, the internal corner angle $\alpha$ of the first corner 20 does not exceed 135° preferably, and more preferably, is set within a range which is 110° or larger and which is smaller than 135°. In addition, one of the reasons that the internal corner angle $\beta$ of the second corner 22 is preferably set to 179° or less, is to clearly define two kinds of side surface portions to be described later and increase strength of the cutting insert.

In the cutting insert 10 of the first embodiment, the internal corner angle $\beta$ of the second corner 22 is set to approximately 168°. Since the internal corner angle $\beta$ of the second corner 22 is thus set close to 180°, at first glance the cutting insert 10 seems to be formed substantially in a plate shape of a regular pentagon in the end surface view. On the other hand, in the present first embodiment, the internal corner angle $\alpha$ of the first corner 20 is set to approximately 120°.

Figure 3:
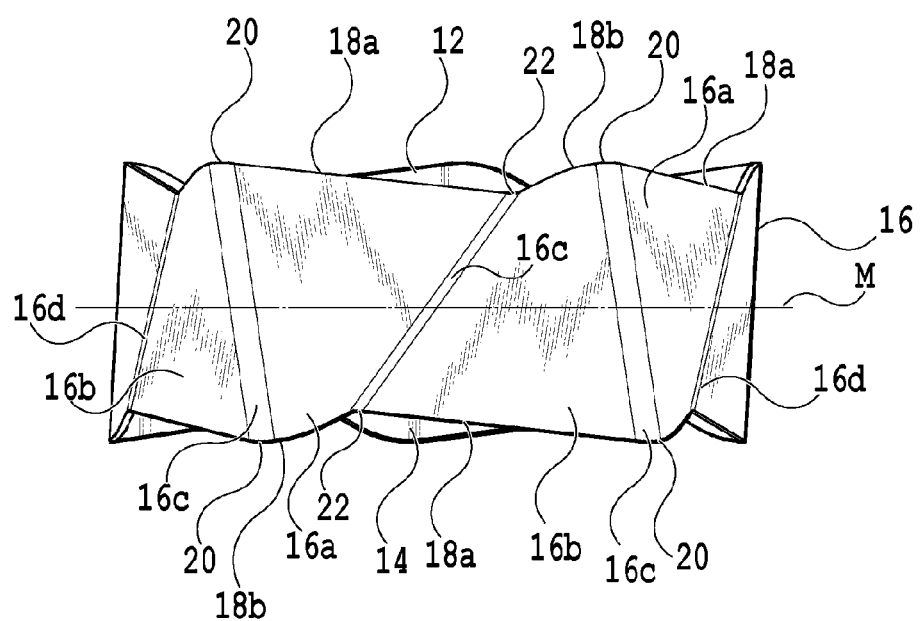
FIG. 3 is a front view of the cutting insert shown in FIG. 2.
Figure 5:
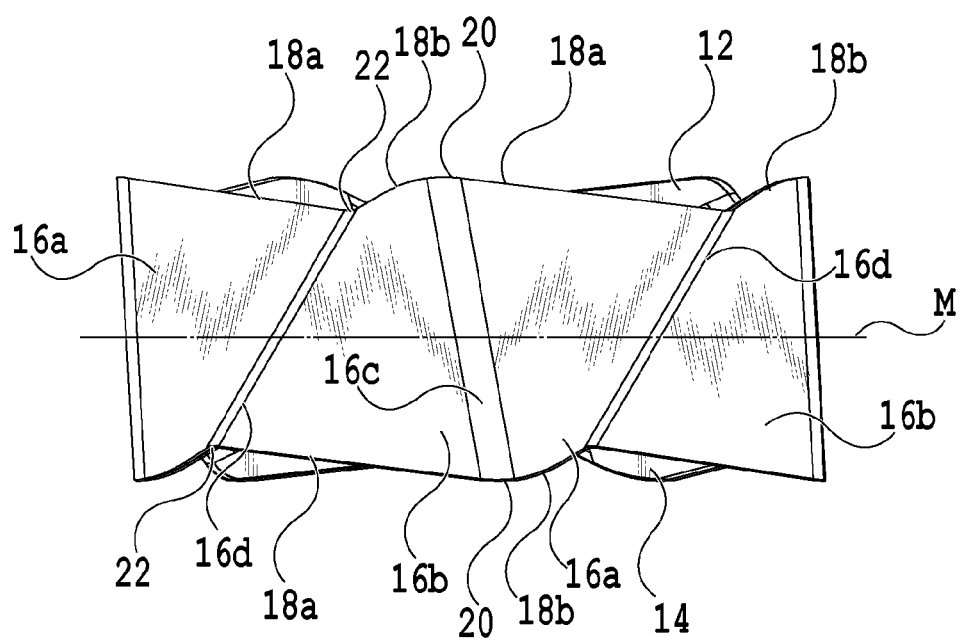
FIG. 5 is a back view of the cutting insert shown in FIG. 2.

Here, as shown in FIG. 3 and FIG. 5, a median plane M extending so as to bisect the cutting insert 10 is defined. The median plane M is located medianly between the two end surfaces 12 and 14. The median plane M herein extends substantially in parallel to the two end surfaces 12 and 14. It should be noted that if the two end surfaces 12 and 14 are not substantially in parallel, for example, a plane on the basis of which the two end surfaces 12 and 14 are the closest to being plane-symmetrical should be set as the median plane M.

In a cross section at the median plane M of the cutting insert 10 in the first embodiment, a diameter of an inscribed circle is approximately 12.70 mm. It should be noted that the inscribed circle in the cross section is preferably defined to be tangent to five surface portions 16d defined in the peripheral surface 16 to connect the second corner 22 of the upper surface 12 and the second corner 22 of the lower surface 14 corresponding thereto. However, for easy management of an inscribed circle dimension of the cutting insert 10 in the first embodiment, each of the surface portions 16d is preferably formed in a plane shape. The cutting insert according to the present invention may be designed in an arbitrary size.

As described above, a plurality of cutting portions 18 are formed at the intersection portion between each of the end surfaces 12 and 14 and the peripheral surface 16. Each cutting portion 18 is formed between two adjacent second corners 22. Each cutting portion 18 has a first cutting edge 18a and a second cutting edge 18b. Here, each cutting portion 18 further has a corner edge 18c between the first cutting edge 18a and the second cutting edge 18b to be connected thereto. In this way, each cutting portion 18 may further have one or more cutting edges in addition to the two cutting edges such as the first cutting edge 18a and the second cutting edge 18b.

In each end surface, a portion of each side of a substantial decagon is alternately defined as the first cutting edge 18a and the second cutting edge 18b, the cutting edges being interposed between the corners 20 and 22. Therefore the first cutting edge 18a and the second cutting edge 18b extend in different directions from each first corner 20. It should be noted that the first cutting edge 18a is configured to be capable of acting as the major cutting edge at the time of being mounted on the tool body, and the second cutting edge 18b is likewise configured to be capable of acting as the minor cutting edge at the time of being mounted on the tool body. Particularly in the present first embodiment, the second cutting edge 18b is configured to be capable of acting as a face cutting edge, and in more detail, is configured to be capable of acting as a finishing cutting edge (wiper).

In addition, when the cutting insert 10 is mounted on the tool body, a rake surface 28 can be formed on one end surface as a front surface, and a flank surface 30 can be formed on the peripheral surface 16. The rake surface 28 includes a rake surface 28a relating to the first cutting edge 18a and a rake surface 28b relating to the second cutting edge 18b. However, in the cutting insert 10, as understandable from the figures, a plane portion of the upper surface 12 or the lower surface 14 extending from the cutting portion 18 in the cutting insert 10, particularly the first cutting edge 18a, is configured so as to become closer to the median plane M as a distance from the first corner 20 or the cutting edge increases, and such a plane portion can act mainly as a rake surface. The flank surface 30 includes a flank surface 30a extending from the first cutting edge 18a, and a flank surface 30b extending from the second cutting edge 18b.

In a region in the vicinity of an outer edge portion of each of the upper surface 12 and the lower surface 14, the plane portion extending substantially obliquely as described above spreads. The plane portion includes a first end surface portion 28a relating to the first cutting edge 18a to extend therefrom and a second end surface portion 28b relating to the second cutting edge 18b to extend therefrom. When the cutting insert 10 is mounted on the tool body, as described above the first cutting edge 18a is configured to be capable of acting as the major cutting edge, and along with it, the first end surface portion 28a is configured to be capable of acting as a major rake surface. Similarly when the cutting insert 10 is mounted on the tool body, the second cutting edge 18b is, as described above, configured to be capable of acting as the minor cutting edge, and along with it, the second end surface portion 28b is configured to be capable of acting as a minor rake surface.

On the peripheral surface 16, a first corner surface 16c extending to connect the first corner 20 of the upper surface 12 and the first corner 20 of the lower surface 14 corresponding thereto, and a second corner surface 16d (corresponding to the above plane portion) extending to connect the second corner 22 of the upper surface 12 and the second corner 22 of the lower surface 14 corresponding thereto are alternately arranged. On the peripheral surface 16, further, side surfaces 16a and 16b having a relation of being inclined approximately in different directions with each other are respectively formed between the first corner surface 16c and the second corner surface 16d. The two side surfaces 16a and 16b herein are, for easy explanation, called a first inclination side surface 16a and a second inclination side surface 16b. Two kinds of the inclination side surfaces 16a and 16b are alternately arranged on the peripheral surface 16, and have substantially the same shape with each other.

Each of the first inclination side surfaces 16a extends between the first cutting edge 18a related to the upper surface 12 and the second cutting edge 18b related to the lower surface 14, and each of the second inclination side surfaces 16b extends between the second cutting edge 18b related to the upper surface 12 and the first cutting edge 18a related to the lower surface 14. Therefore the first inclination side surface 16a has a first side surface portion 30a extending from the first cutting edge 18a related to the upper surface 12 and a second side surface portion 30b extending from the second cutting edge 18b related to the lower surface 14 formed thereon. Similarly, the second inclination side surface 16b has a second side surface portion 30b extending from the second cutting edge 18b related to the upper surface 12 and a first side surface portion 30a extending from the first cutting edge 18a related to the lower surface 14 formed thereon.

When the cutting insert 10 is mounted on the tool body, the first cutting edge 18a is configured to be capable of acting as a major cutting edge as described above, and along with it, the first side surface portion 30a is configured to be capable of acting as a major flank surface. Likewise, when the cutting insert 10 is mounted on the tool body, the second cutting edge 18b is configured to be capable of acting as a minor cutting edge as described above, and along with it, the second side surface portion 30b is configured to be capable of acting as a minor flank surface.

Figure 9:
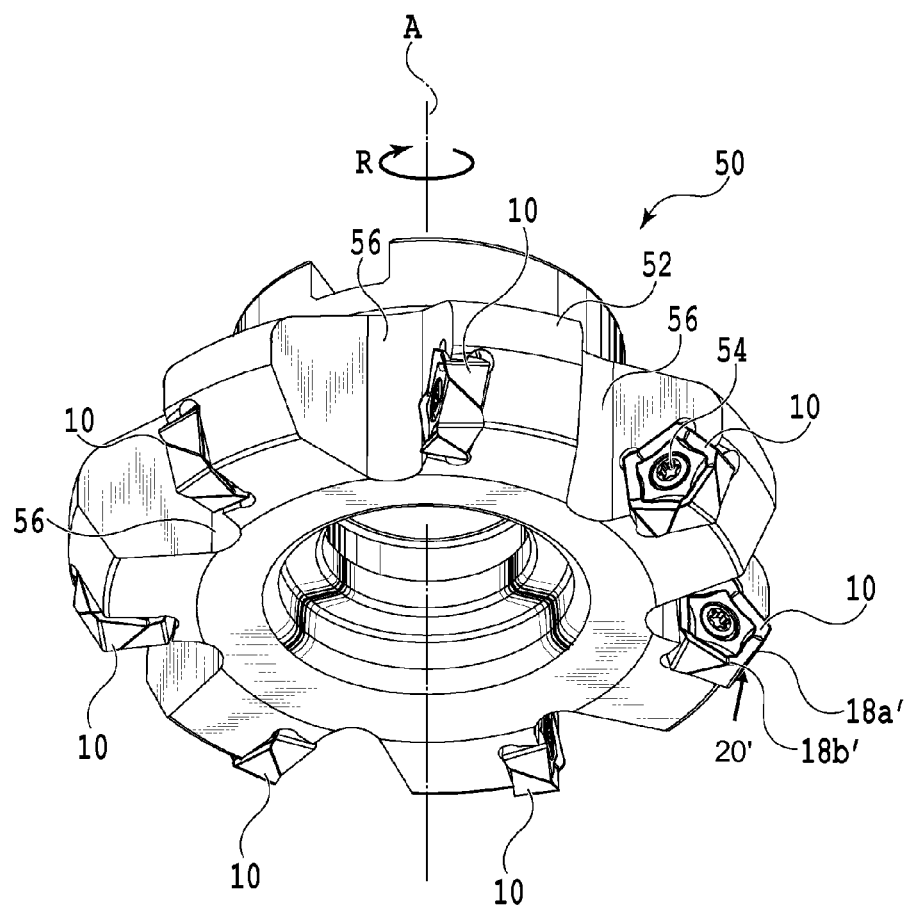
FIG. 9 is a perspective view of a milling cutter as a rotational cutting tool on which the cutting insert in FIG. 1 is mounted, according to the first embodiment.
Figure 10:
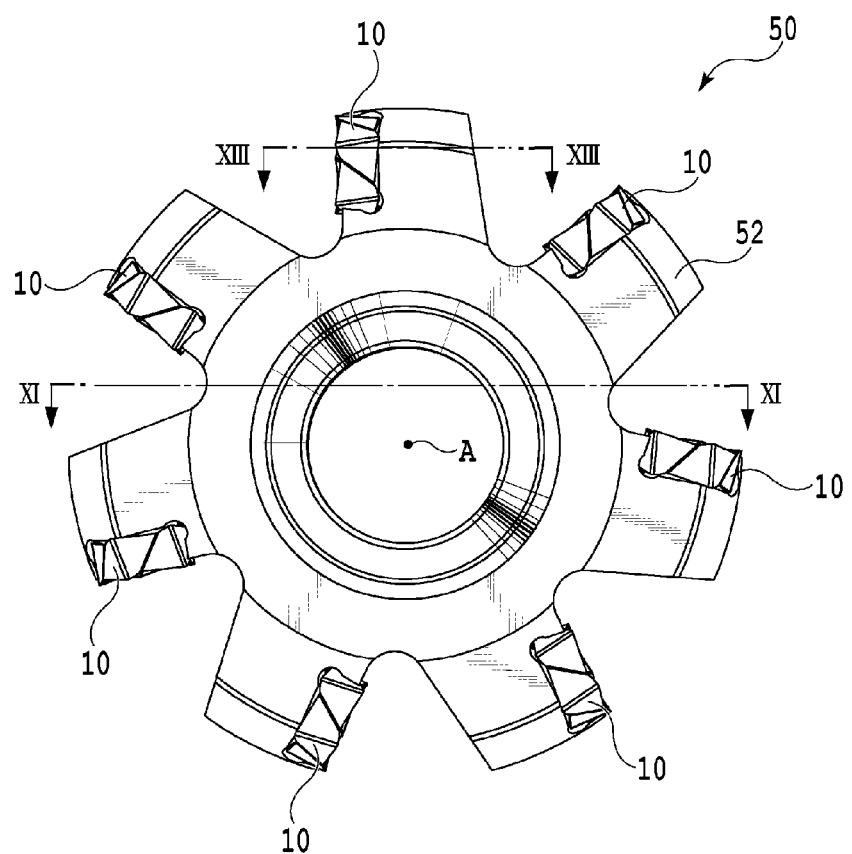
FIG. 10 is a plan view of the milling cutter in FIG. 9.

As shown in FIG. 9, the cutting insert 10 in the first embodiment is a right hand insert to be mounted on a tool body 52 in a milling cutter 50 as a rotational cutting tool to rotate in a clockwise direction around a tool rotational center axis A, that is, a direction of arrow R. Therefore as shown in FIG. 9, when the cutting insert 10 is viewed as a substantial decagon, the first cutting edge 18a' located counterclockwise to the insert's operative first corner 20' can be used as the major cutting edge, and the second cutting edge 18b' located clockwise to the insert's operative first corner 20' can be used as the minor cutting edge.

The first cutting edge 18a and the second cutting edge 18b may be respectively formed in a straight line shape, but respectively not limited thereto, each of them may be a cutting edge in a curved shape or a cutting edge by combination of a straight line and a curved line. In addition, a wiper cutting edge (not shown) may be formed in the cutting portion 18. The cutting edges 18a and 18b respectively may be formed to extend within one plane, but may be formed to extend as if they are a three-dimensional curve.

It should be noted that in the first embodiment, the first corner 20 is formed to take on roundness. In the present embodiment, a curvature radius of the roundness in the first corner 20 is made as 0.80 mm. The second corner 22 may include some degree of the roundness, but is substantially formed in a straight line shape. A shape of the second corner 22 is defined by formation of a second corner side surface 16d, that is, a flat surface (land) having a narrow width at the intersecting ridge portion between the two corresponding first side surface 16a and second side surface 16b. Such formation of the second corner side surface 16d enables reduction of a possibility that an edge portion at the intersection region between the first inclination side surface 16a and the second inclination side surface 16b chips. In the present embodiment, a width of the straight line-shaped portion of the second corner 22 is set to 0.5 mm. However, the second corner 22 may be formed roundly as a curve.

It should be noted that the cutting edge periphery of the cutting insert 10 may be made of a hard material such as cemented carbide, cermet, ceramic, cubic boron nitride, and the like, and may be formed by coating a surface of the hard material with a PVD or CVD coating film.

The median plane M already defined extends substantially in parallel to the upper surface 12 and the lower surface 14 particularly in the present first embodiment, and substantially bisects the cutting insert 10 into upper and lower insert portions. The upper surface 12 and the lower surface 14 each formed in a substantial decagon are provided at the center with a mounting hole 32 formed thereon to penetrate from the upper surface 12 to the lower surface 14. Here, the mounting hole 32 extends to be perpendicular to the median plane M, and a center axis B of the mounting hole 32 is perpendicular to the median plane M. It should be noted that the mounting hole 32 is designed so that the upper surface 12 and the lower surface 14 respectively have a predetermined rotation symmetry around the center axis B. This is because the cutting insert is an indexable cutting insert.

Figure 6:
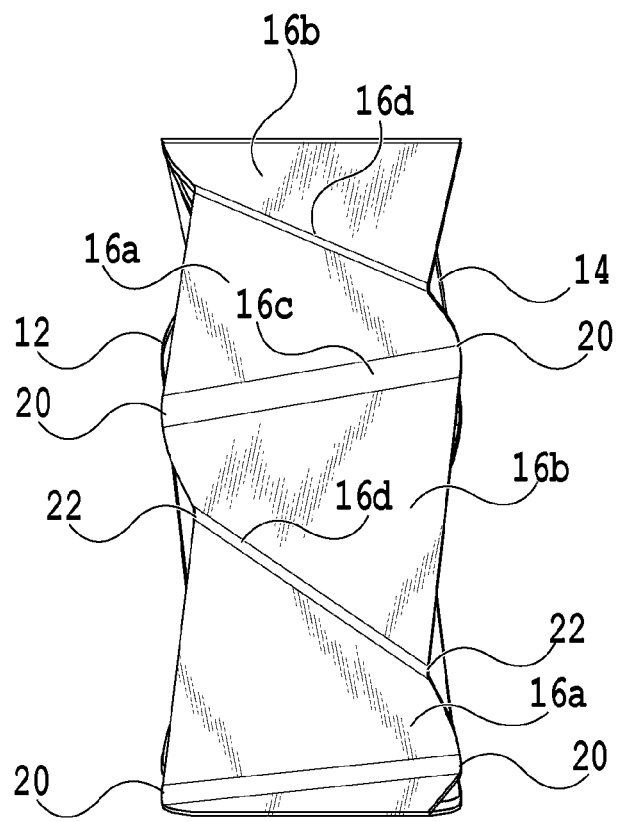
FIG. 6 is a right side view of the cutting insert shown in FIG. 2.

In the side surface view of the cutting insert 10 as shown in FIGS. 3, 5 and 6, that is, as the cutting insert 10 is viewed from the side of the peripheral surface 16, each of the first cutting edges 18a has an inclination portion which is inclined so as to gradually become closer to the median plane M as a distance from the related first corner 20 increases. The inclination portion contributes to an inclination of the first cutting edge 18a as the operative major cutting edge when the cutting insert 10 is mounted on the tool body 52. That is, this inclination is effective when the axial rake angle is desired to be set to a positive angle. Particularly in the present first embodiment, each of the first cutting edges 18a linearly extends so as to become closer to the median plane M as a distance from the related first corner 20 increases as a whole.

In the present embodiment, further, in the side surface view of the cutting insert 10, each of the second cutting edges 18b has an inclination portion which is inclined so as to gradually become closer to the median plane M as a distance from the related first corner 20 increases. Particularly in the present first embodiment, each of the second cutting edges 18b extends so as to become closer to the median plane M as a distance from the related first corner 20 increases as a whole.

As a result, each of the first cutting edge 18a and the second cutting edge 18b which are adjacent with each other in the one cutting portion 18 and extend to interpose the common first corner 20 therebetween has a substantially V-letter shape in the side surface view. However, each of the first cutting edge and the second cutting edge in the present invention is not limited to being formed in such a substantially V-letter shape. For example, a portion in parallel to the median plane M may be provided in one or both of the first cutting edge and the second cutting edge. In addition, the second cutting edge may be partly or all formed to a shape suitable to an application such as a knurling shape or the like. In other words, according to the present invention, in the side surface view of the cutting insert, the first cutting edge is only required to have the inclination portion which is inclined such as to become closer to the median plane M as a distance from the first corner increases, and the cutting edge portions may be formed in any other configuration.

In the side surface view of the cutting insert 10, an inclination angle of the inclination portion in the first cutting edge 18a, toward the median plane M, exceeds 0° and is set within a range of 10° or less. The range of this inclination angle is a general angle range at the time of inclining the major cutting edge of the cutting insert. When the cutting insert 10 having such a configuration is mounted on the tool body 52, an axial rake angle relating to the first cutting edge 18a' acting as the major cutting edge can be larger than the inclination angle of the inclination portion in the first cutting edge. This is mainly because of two reasons as follows.

The first reason is that when the cutting insert 10 is mounted on the cutting tool body 52, a length of the first cutting edge 18a' acting as the major cutting edge in a direction of the axis A is made shorter than a length of the first cutting edge 18a' itself due to an influence of the cutting edge angle. Since a difference in height of the cutting edge 18a' to the median plane M is the same and the length of the cutting edge 18a' in the direction of the axis A is made short, the same effect as the effect obtained at the time of increasing the inclination angle of the cutting edge 18a' can be obtained. The second reason is that any rake angle can be set by providing a plane portion extending substantially obliquely on the end surface of the cutting insert 10, that is, the uplifted portion. For example, the axial rake angle in the tool can be made within a range which is more than 0° and which is 40° or smaller. In the present embodiment, the axial rake angle thereof is set to approximately 20°.

It should be noted that in the end surface view of the cutting insert 10, a ratio of a length of the first cutting edge 18a to a length of the second cutting edge 18b is allowed to be any ratio, but preferably it is made within a range from 4:1 to 5:2, including 4:1 and 5:2. In the cutting insert 10 of the present first embodiment, the ratio of the length of the first cutting edge 18a to the length of the second cutting edge 18b is approximately 3:1.

Further, particularly in the cutting insert 10 of the present first embodiment, an inclination of the first inclination side surface 16a and an inclination of the second inclination side surface 16b are characterized. These inclinations are defined to meet two conditions as follows. The first condition is that a first side surface portion 30a formed to extend from the first cutting edge 18a to the peripheral surface 16 has a portion forming an insert internal obtuse angle to a plane defined to pass through the first cutting edge 18a and to be in parallel to the median plane M. The second condition is that a second side surface portion 30b formed to extend from the second cutting edge 18b to the peripheral surface 16 has a portion forming an insert internal acute angle to a plane defined to pass through the second cutting edge 18b and to be in parallel to the median plane M. It should be noted that the insert internal obtuse angle is preferably defined on a plane passing through the first cutting edge 18a and extending to be perpendicular to the median plane M, and particularly, is preferably defined on a plane defined to be perpendicular to the first cutting edge 18a in the end surface view. This is because in general, such a cross-sectional shape is measured by a form contour measuring instrument (e.g. a contracer). The same can be applied to the insert internal acute angle.

In addition, in the cutting insert 10 in the present first embodiment, the first inclination side surface 16a and the second side surface 16b are designed to meet a third condition. The third condition is that the first side surface portion 30a related to one of the two end surfaces 12 and 14 is on the same plane with the corresponding second side surface portion 30b related to the other of the two end surfaces 12 and 14.

Figure 7:
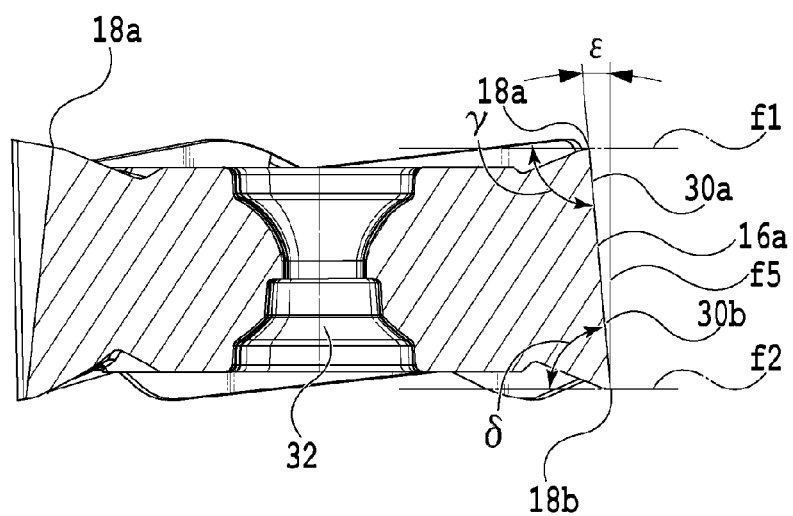
FIG. 7 is a cross section view of line VII-VII in FIG. 2 of the cutting insert shown in FIG. 2.
Figure 8:
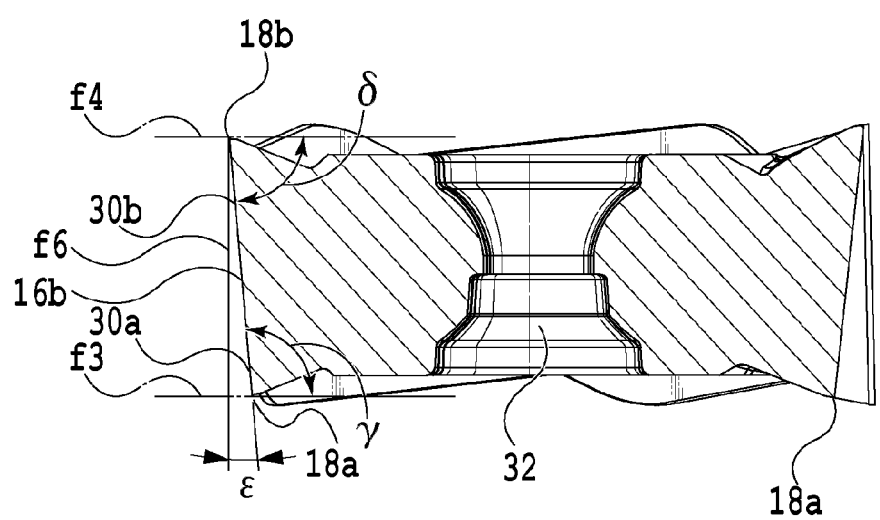
FIG. 8 is a cross section view of line VIII-VIII in FIG. 2 of the cutting insert shown in FIG. 2.

Here, cross section views of FIG. 7 and FIG. 8 will be referred to. The cross section view in FIG. 7 taken along line VII-VII in FIG. 2 is a cross section view of the cutting insert 10 on a plane perpendicular to the median plane M and defined to pass through a first cutting edge 18a related to the upper surface 12, that is, the first end surface and the first side surface portion 30a related thereto, as well as to be perpendicular to the first cutting edge 18a in the end surface view. In addition, the cross section view in FIG. 8 taken along line VIII-VIII in FIG. 2 is a cross section view of the cutting insert 10 on a plane perpendicular to the median plane M and defined to pass through a second cutting edge 18b related to the upper surface 12, that is, the first end surface and the second side surface portion 30b related thereto, as well as to be perpendicular to the second cutting edge 18b in the end surface view. Here, according to the third condition, FIG. 7 is also a cross section view of the cutting insert 10 on a plane perpendicular to the median plane M and defined to pass through the second cutting edge 18b related to the lower surface 14, that is, the second end surface and the second side surface portion 30b related thereto, as well as to be perpendicular to the second cutting edge 18b in the end surface view. In addition, FIG. 8 is also a cross section view of the cutting insert 10 on a plane perpendicular to the median plane M and defined to pass through the first cutting edge 18a related to the lower surface 14, that is, the second end surface and the first side surface portion 30a related thereto, as well as to be perpendicular to the first cutting edge 18a in the end surface view.

In the cross section view in each of FIG. 7 and FIG. 8, the first side surface portion 30a extending from the first cutting edge 18a is inclined outwardly as heading away from the first cutting edge 18a, and forms an insert internal obtuse angle γ to each of planes f1 and f3 defined to pass through the first cutting edge 18a and extend to be in parallel to the median plane M. On the other hand, in the cross section view in each of FIG. 7 and FIG. 8, the second side surface portion 30b extending from the second cutting edge 18b is inclined inwardly as heading away from the second cutting edge 18b, and forms an insert internal acute angle δ to each of planes f2 and f4 defined to pass through the second cutting edge 18b and extend to be in parallel to the median plane M. Further, in the present first embodiment, assuming that planes f5 and f6 perpendicular to the median plane M are defined, the first inclination side surface 16a and the second inclination side surface 16b respectively are inclined at an angle ε (=90°−δ) from the planes f5 and f6 respectively as a whole.

The second side surface portion 30b in each of the inclination side surfaces 16a and 16b having such a characteristic configuration contributes to forming a positive clearance angle on the flank surface of an operative second cutting edge 18b' (see FIG. 9), when the cutting insert 10 is mounted on the tool body 52. The positive clearance angle may be the angle ε, for example.

The angle ε is preferably within a range which is 2° or larger and which is 25° or smaller. In other words, the insert internal acute angle δ may be within a range which is 65° or larger and which is 88° or smaller. In a case where the angle ε is less than 2°, a difference in cutting performance between the cutting insert 10 and a so-called negative type cutting insert is made small, and a contribution degree to making an angle of the flank surface in the operative second cutting edge 18b' be positive is largely reduced. Therefore the angle ε is preferably 2° or more. In addition, in a case where the angle ε exceeds 25°, since a tool angle in the periphery of the operative second edge 18b' is excessively acute, a probability that a problem, such as chipping or damage, occurs in the second cutting edge and in the periphery thereof is rapidly increased. Therefore the angle ε is preferably 25° or less. In the cutting insert 10 in the present first embodiment, the angle ε is set to approximately 5°. It should be noted that in the present embodiment, each of the first inclination side surface 16a and the second inclination side surface 16b is formed as a substantially flat surface, but, not limited thereto, for example, one or both thereof may have one or plural curved surfaces in the halfway.

The cutting insert 10 configured as described above is detachably mounted on the tool body 52. A milling cutter 50 as a cutting tool in which the cutting insert 10 is mounted on the tool body 52 is illustrated in FIG. 9 to FIG. 14. The cutting insert 10 is mounted in an insert receiving pocket or an insert seat 53 in the tool body 52. The cutting insert 10 is retained in the insert seat 53 of the tool body 52 when a screw 54 is threaded into a screw hole (not shown) of the insert seat 53 through the mounting hole 32 thereof in a state of being arranged in the insert seat 53.

Figure 11:
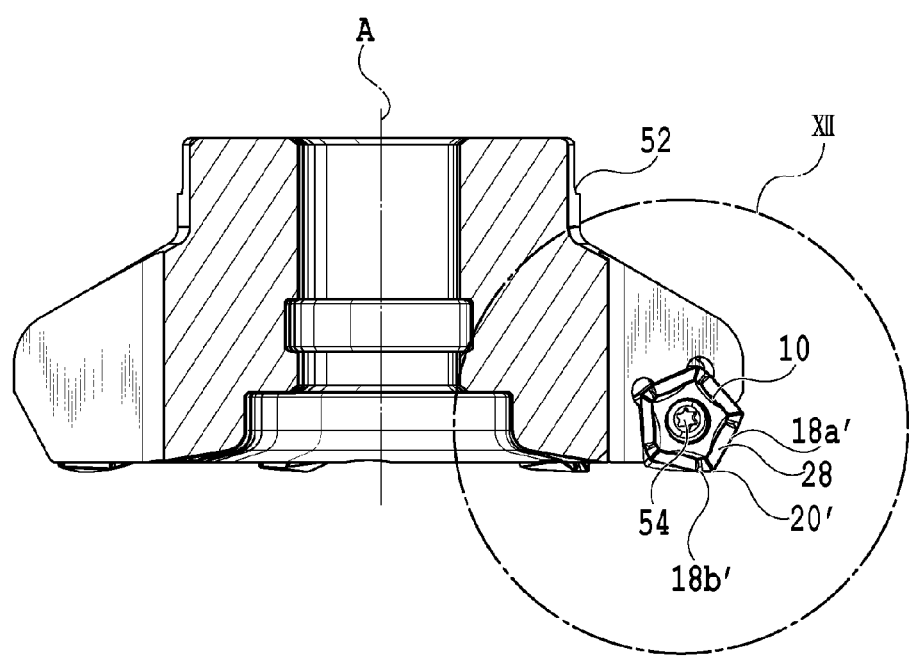
FIG. 11 is a cross section view of line XI-XI in FIG. 10.
Figure 12:
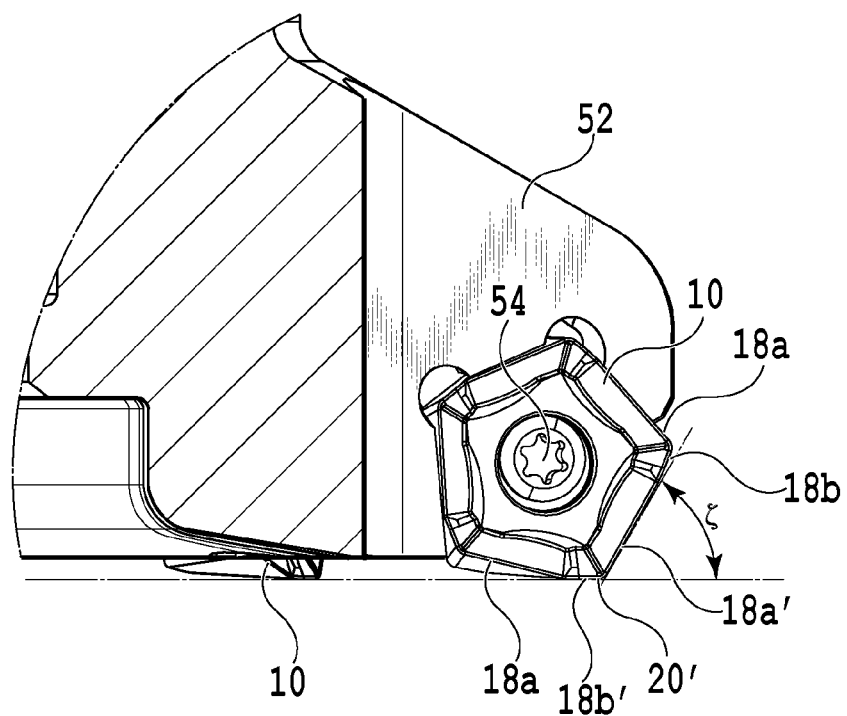
FIG. 12 is an enlarged view of circle XII in FIG. 11.
Figure 13:
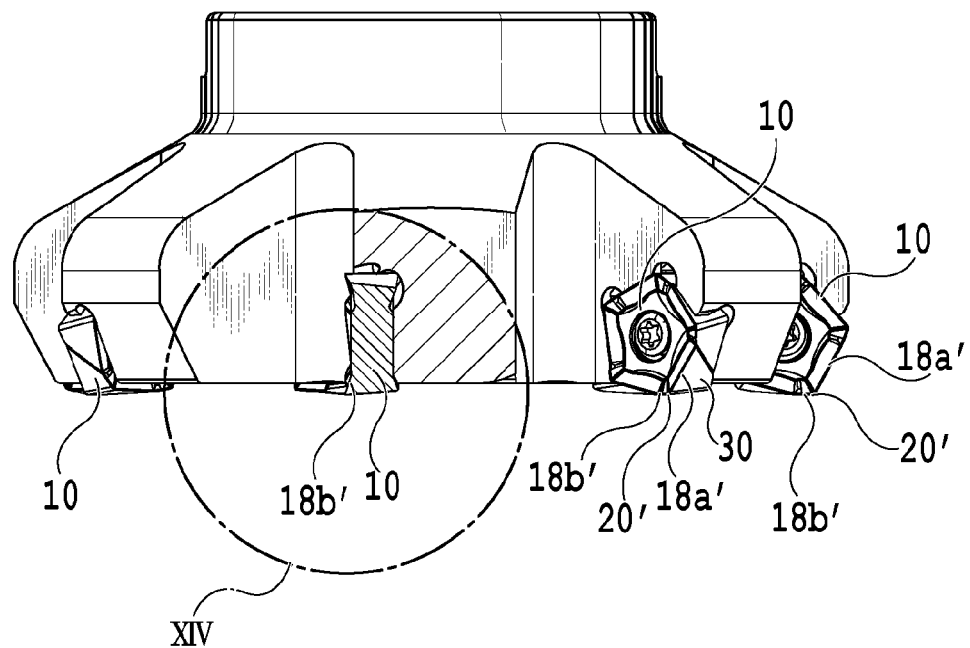
FIG. 13 is a cross section view of line XIII-XIII in FIG. 10.

Here, FIG. 11 and FIG. 12, particularly FIG. 12 will be referred to. As understood from these figures, in the cutting insert 10 mounted on the tool body 52, the operative first cutting edge 18a' and the operative second cutting edge 18b' connected through an operative first corner 20' positioned in a leading end can act as cutting edges. It is designed that the first cutting edge 18a' acts as the major cutting edge and the second cutting edge 18b' acts as the minor cutting edge, particularly as a finishing edge herein. A cutting edge angle ζ in the milling cutter 50 in regard to the operative first cutting edge 18a' is large, and is set to 45° or more.

Figure 14:
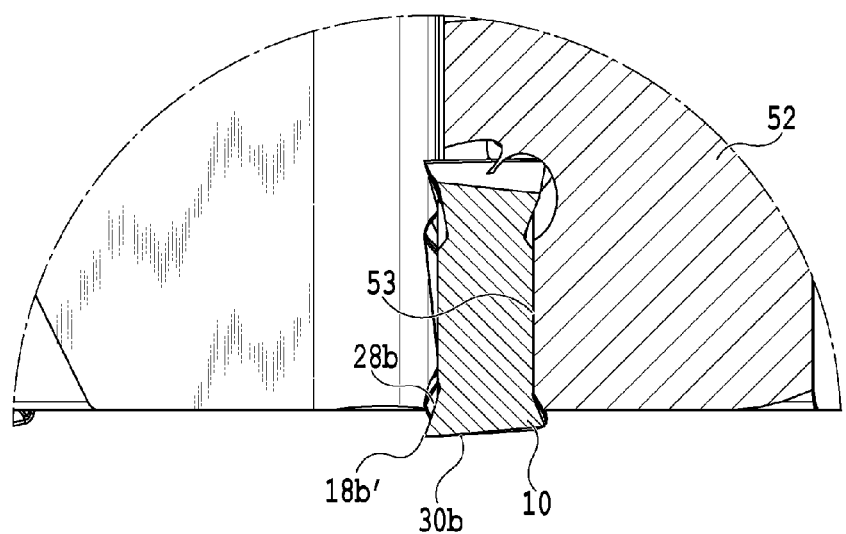
FIG. 14 is an enlarged view of circle XIV in FIG. 13.
Figure 15:
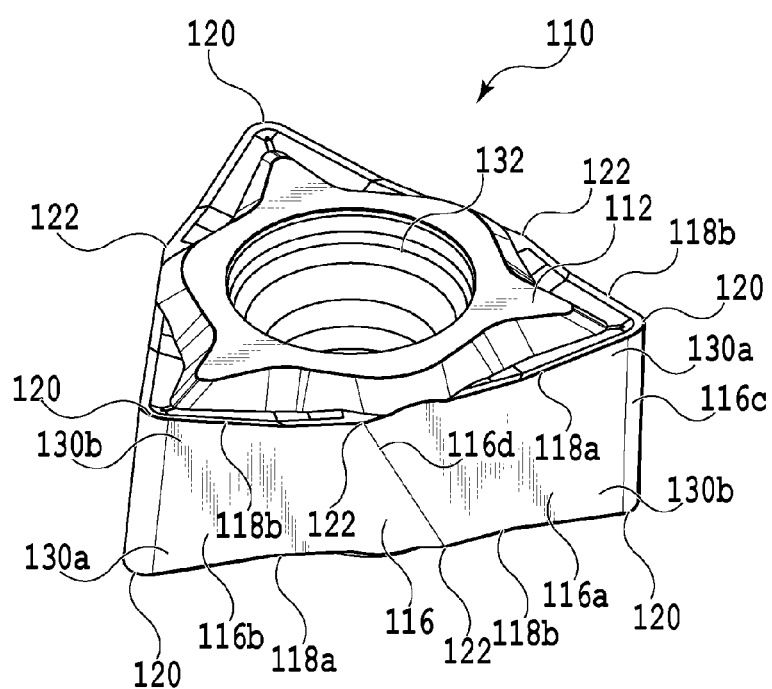
FIG. 15 is a perspective view of a cutting insert according to a second embodiment in the present invention.
Figure 16B:
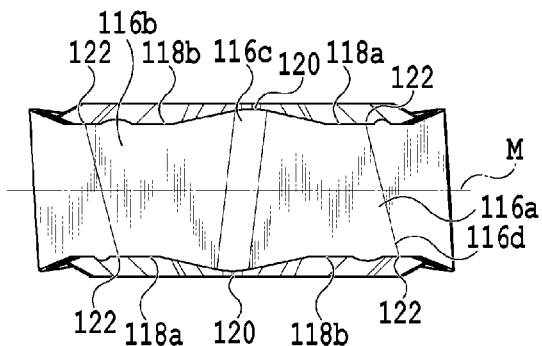
FIG. 16B is a back view of the cutting insert shown in FIG. 16A.
Figure 16A:
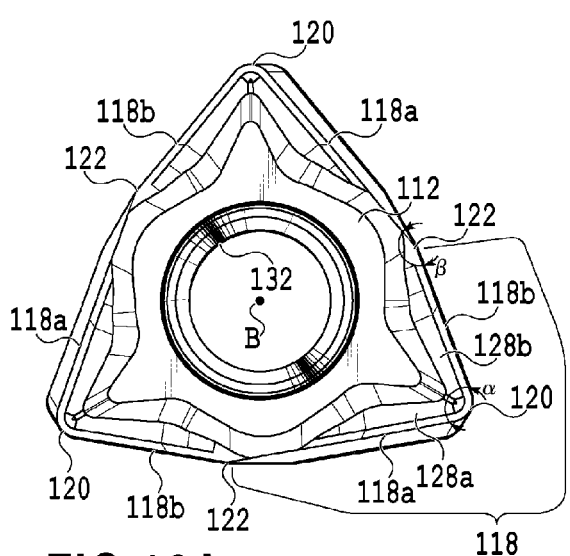
FIG. 16A is a plan view of the cutting insert shown in FIG. 15.
Figure 16D:
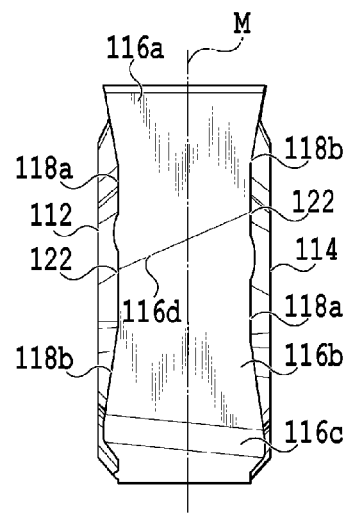
FIG. 16D is a right side view of the cutting insert shown in FIG. 16A.
Figure 16C:
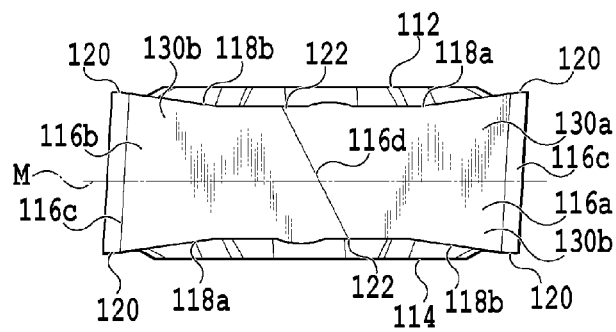
FIG. 16C is a front view of the cutting insert shown in FIG. 16A.
Figure 17:
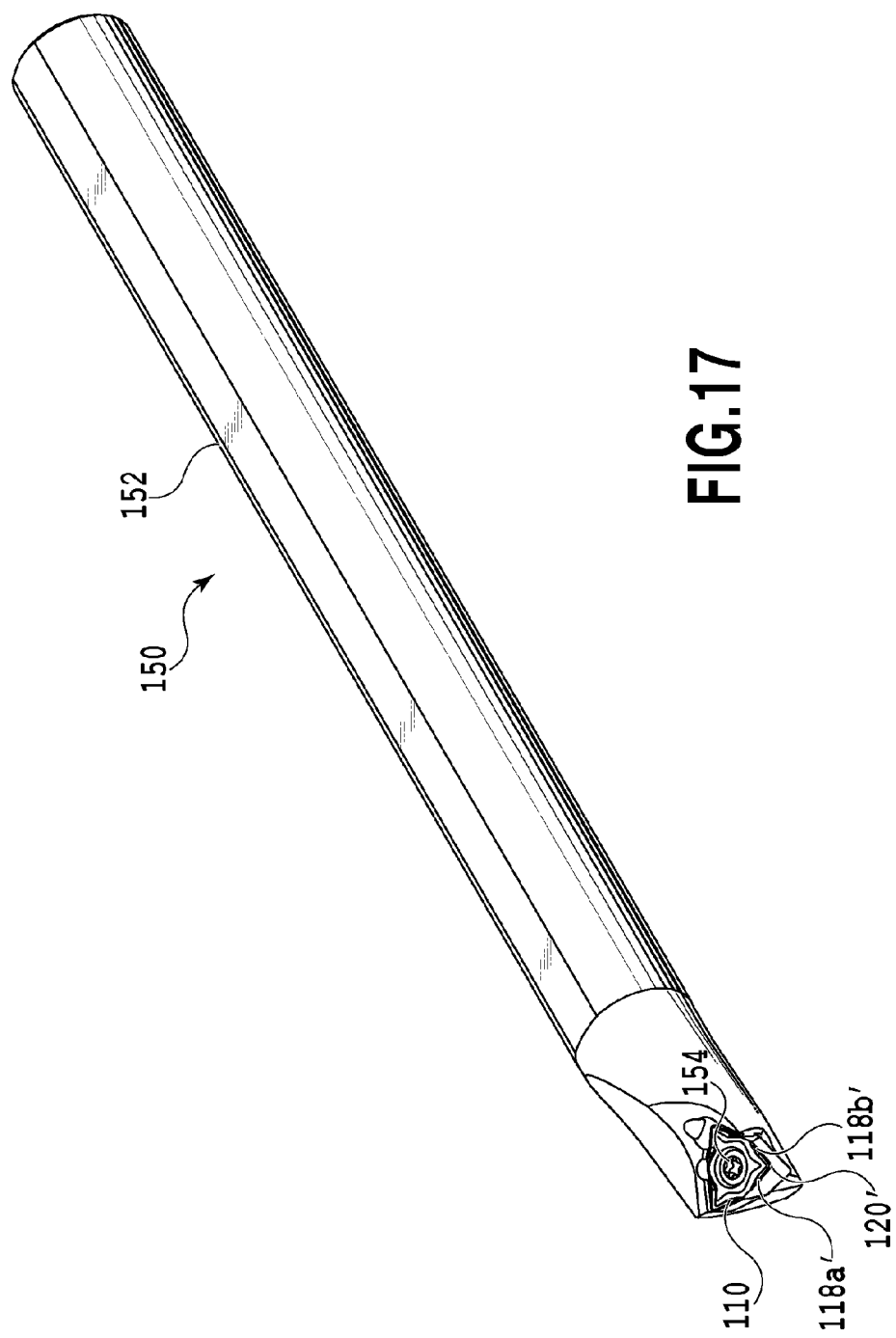
FIG. 17 is a perspective view of a boring tool as a cutting tool on which the cutting insert in FIG. 15 is mounted, according to the second embodiment.
Figure 19:
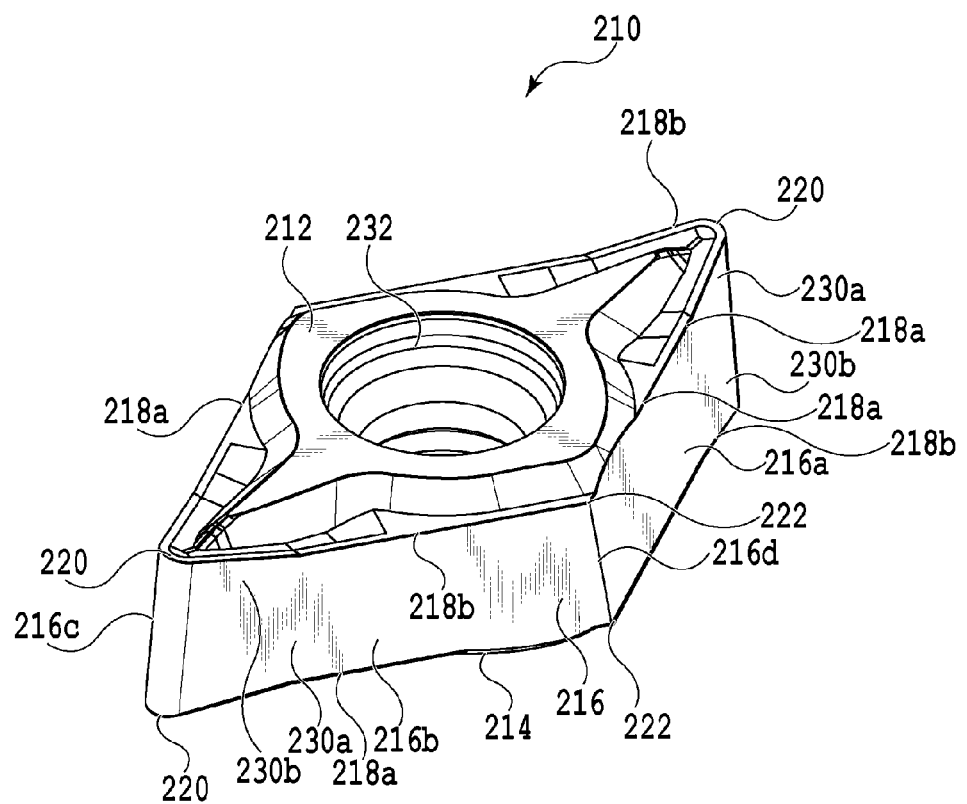
FIG. 19 is a perspective view of a cutting insert according to a third embodiment in the present invention.
Figure 21:
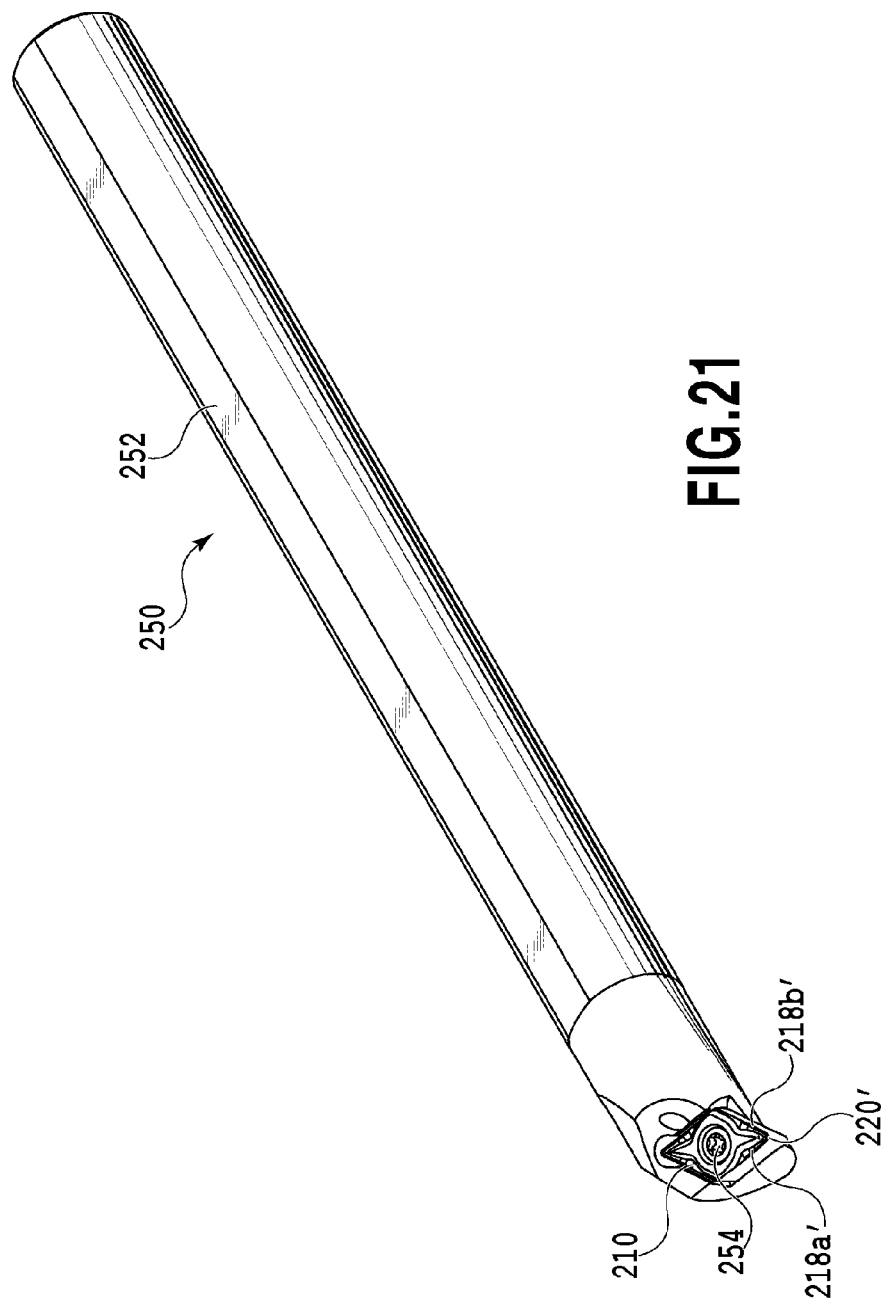
FIG. 21 is a perspective view of a boring tool as a cutting tool on which the cutting insert in FIG. 19 is mounted, according to the third embodiment.

In addition, in the present first embodiment, as shown in FIG. 14 the cutting insert 10 is mounted on the tool body 52 without becoming in a so-called negative geometry. By doing so, in the cutting insert 10 mounted on the tool body 52, a positive axial rake angle is ensured and a positive clearance angle is also ensured. It should be noted that in FIG. 14, for easy understanding, the other cutting inserts 10 mounted on the mill body 52 positioned are omitted in illustration.

The cutting insert 10 in the present first embodiment has the inclination side surfaces 16a and 16b as described above. Therefore when the cutting insert 10 is mounted on the cutting tool body 52, it is not necessary to arrange the cutting insert 10 to make the apparent axial rake angle of the cutting insert 10 in a direction of the tool rotational axis A be in a so-called negative geometry. That is, the cutting insert 10 can be mounted on the tool body 52 to have the positive clearance angle of, for example, 20° or less without taking particular measures. Even if the cutting insert is particularly arranged in the tool body in a negative geometry, an inclination of the cutting insert is allowed to be 2° or less, for example, and is not required to have a large negative angle.

Since the first cutting edge 18a is inclined to become closer to the median plane M as a distance from the first corner 20 increases, a large positive axial rake angle in the milling cutter 50 is easily and accurately ensured because of a relation to a shape of the rake surface in the cutting insert 10. On the other hand, for ensuring the positive clearance angle in regard to the first cutting edge 18a, the cutting insert 10 is arranged in the tool body 52 so that an apparent radial rake angle becomes a so-called negative angle. That is, the cutting insert 10 is arranged on the tool body 52 so that the end surface directed to a front side is directed outside to a rotational direction of the tool. Therefore it is easy to position the cutting insert 10 to the insert seat 53 of the tool body 52, and it is difficult for a fastening screw 54 and a screw driver (not shown) (e.g. star driver) fastening the screw 54 to interfere with the tool body 52. Therefore in the tool body 52, a chip discharge groove (chip pocket) 56 provided in the periphery of the insert seat 53 on which the cutting insert 10 can be mounted can be formed only in consideration of discharge characteristics of chips. Accordingly the chip discharge groove 56 is formed to have a size only in consideration of discharge characteristics of chips.

The configuration that the end surface in the front side of the cutting insert is thus directed outside to the rotational direction of the tool is advantageous in a case where the cutting insert is formed of a multi-edge type for enhancing a processing efficiency of the rotational cutting tool. Not illustrated, for example, is a case of using the conventional cutting insert having an inscribed circle of the order of 12.70 mm in a rotational cutting tool having a cutter diameter of 100 mm, where the edge number of the insert is seven at the most. On the other hand, in a case of arranging the cutting insert according to the present invention to the tool body so that a radial rake angle becomes approximately 4° at a negative angle, it is found out that it is possible to increase the edge number of the cutting insert according to the present invention to 11. In this way, as compared to the conventional cutting tool, an improvement on the feeding is possible by 60% or more in the cutting tool equipped with the cutting insert according to the present invention, and according to the present invention, the processing efficiency of the cutting tool can be largely improved.

The cutting insert 10 in the present embodiment is formed in a substantially decagonal plate shape, but for example, may be changed substantially to a polygonal plate shape with twelve sides, a polygonal plate shape with sixteen sides or the like. However, as described above, the two kinds of side surfaces 16a and 16b are formed and the two surfaces are substantially combined. Therefore the number of sides of a substantial polygon is preferably set to even numbers. The purpose of increasing the number of sides of the substantial polygon is to increase the use corner number.

In regard to the cutting insert 10 in the present embodiment, the upper surface and the lower surface can be reversed, and both surfaces thereof can be thus used, giving a reversible cutting insert. When the upper surface and the lower surface are reversed, the cutting insert 10 has the same shape. That is, when a cross section of the cutting insert 10 is taken along the median plane M, the cross-sectional shape is substantially a regular decagon. Not limited to a case of the present embodiment, the cutting insert of a substantially polygonal plate shape according to the present invention will have a regular polygon in a cross section on the median plane M.

Generally speaking, the manufacturing method of the cutting insert 10 in the present embodiment is basically the same as the manufacturing method of the conventional cutting insert. The peripheral surface 16 can be manufactured by grinding processing, for example. However, in a case of forming the cutting insert 10 by powder pressure forming and sintering without grinding the peripheral surface 16, a specific metallic mold and a powder pressure forming machine become necessary. Specifically when a specific metallic mold called a so-called split mold is used and a compact is taken out from the metallic mold after the pressure forming, the metallic mold is divided to take out the compact. It should be noted that even in this case, the manufacturing method of the cutting insert 10 in the present embodiment is the same as the manufacturing method of the conventional cutting insert other than the metallic mold and the powder pressure forming machine.

The cutting insert as described above is detachably mounted on the tool body in the cutting tool. The cutting tool is detachably mounted on a machine tool such as a machining center or the like. The cutting tool gives relative movement to a workpiece to perform cutting processing. It should be noted that the cutting tool 50 may be used even in the machining tool for rotating a workpiece, such as a lathe or the like, but when the cutting tool 50 is used as the rotating tool in the machining tool such as the machining center or the like, it can bestow more benefits on characteristics of the cutting insert 10 and the cutting tool 50. However, hereinafter a cutting insert and a cutting tool according to each of different embodiments in the present invention, which are used in a rotating workpiece, will be explained.

Next, a second embodiment according to the present invention will be explained with reference to FIG. 15 to FIG. 18C. The second embodiment relates to a boring tool. It should be noted that in the following explanation in the second embodiment, characters corresponding to the characters used in the above explanation of the first embodiment are given to components corresponding to the components in the first embodiment.

A cutting insert 110 according to the second embodiment is provided with characteristics similar to those of the above cutting insert 10. For mainly clarifying a corresponding relation between components of the cutting insert 10 in the first embodiment and components of the cutting insert 110 in the second embodiment, the cutting insert 110 will be simply explained hereinafter.

The cutting insert 110 is provided with an upper surface 112 and a lower surface 114 as two opposing end surfaces, and a peripheral surface 116 extending therebetween. A plurality of cutting portions 118 are formed at the intersection portion between the upper surface 112 or the lower surface 114 and the peripheral surface 116. Each cutting portion 118 is formed between corresponding second corners 122, and has a first cutting edge 118a and a second cutting edge 118b. The first cutting edge 118a has a portion extending to approach the median plane as a distance from a corresponding first corner 120 increases. A first end surface portion 128a and a first side surface portion 130a relating to the first cutting edge 118a are formed, and a second end surface portion 128b and a second side surface portion 130b relating to the second cutting edge 118b are formed. It should be noted that herein the cutting insert 110 is indexable, and the median plane M is perpendicular to a center axis B of a mounting hole 132.

In the end surface view (refer to FIG. 16A), two kinds of corners 120 and 122 having different internal corner angles are alternately formed in the end surface. An internal corner angle α of the first corner 120 is smaller than an internal corner angle β of the second corner 122, and herein the internal corner angle β of the second corner 122 is set within a range which is 153° or larger and which is 179° or smaller. The peripheral surface 116 is provided with two kinds of inclination side surfaces 116a and 116b, a first corner side surface 116c extending to connect the first corners 120 of both end surfaces and alternately arranged therebetween, and a second corner side surface 116d likewise extending to connect the second corners 122 of both end surfaces. It should be noted that in the present second embodiment, a width of the second corner side surface 116d is extremely narrow, and is simply illustrated by lines in the figure.

Each of the first inclination side surfaces 116a extends between a first cutting edge 118a related to the upper surface 112 and a second cutting edge 118b related to the lower surface 114, and each of the second inclination side surfaces 116b extends between a second cutting edge 118b related to the upper surface 112 and a first cutting edge 118a related to the lower surface 114. Therefore on the first inclination side surface 116a, a first side surface portion 130a extending from the first cutting edge 118a related to the upper surface 112, and a second side surface portion 130b extending from the second cutting edge 118b related to the lower surface 114 are formed. On the second inclination side surface 116b, a second side surface portion 130b extending from the second cutting edge 118b related to the upper surface 112, and a first side surface portion 130a extending from the first cutting edge 118a related to the lower surface 114 are formed. When the cutting insert 110 is mounted on the tool body 152, the first cutting edge 118a and the second cutting edge 118b respectively are configured to be able to act as the major cutting edge and the face cutting edge. As a result, the first side surface portion 130a is configured to be able to act as a major flank surface to a corresponding operative cutting edge 118a', and the second side surface portion 130b is configured to be able to act as a flank surface of the face cutting edge to a corresponding operative second cutting edge 118b'. It should be noted that the operative first cutting edge 118a' and the operative second cutting edge 118b' are adjacent through a first corner 120' positioned at a leading end.

In addition, the first inclination side surface 116a and the second inclination side surface 116b are configured to meet not only the above first condition and the above second condition, but also the above third condition as similar to the first inclination side surface 16a and the second inclination side surface 16b in the cutting insert 10 in the first embodiment (refer to FIGS. 7 and 8). Each inclination angle of the inclination side surfaces 116a and 116b is within the angle range explained in the above first embodiment.

The cutting insert 110 having such a configuration is detachably mounted in an insert seat 153 of a tool body 152 by a screw 154. A boring tool 150 on which the cutting insert 110 is mounted on the tool body 152 can be used in a lathe, and is generally used for processing a rotating workpiece. Therefore the boring tool 150 itself does not rotate regularly, but the present invention does not exclude a case where the boring tool 150 itself is used to rotate.

Even the cutting insert 110 and the boring tool 150 can likewise achieve the operation and the effect explained in regard to the cutting insert 10 and the milling cutter 50.

In addition, the cutting insert 110 and the boring tool 150 each having such a configuration are advantageous particularly in a case where a hole to be processed has a small diameter. In a case where the hole to be processed has a small hole, a general negative type of cutting insert both surfaces of which can be used is regularly mounted on the tool body such that a side rake angle becomes a large negative rake angle for ensuring a relief from the hole inner peripheral surface. However, since the cutting insert 110 has the peripheral surface 116 with the above configuration, a positive clearance angle is appropriately ensured in an area of interfering with the hole inner peripheral surface in the boring tool 150, particularly in the second side surface portion 130b acting as the flank surface of the operative second cutting edge 118b' without depending on such a mounting structure of the cutting insert 110. Therefore in the cutting tool 110 and the boring tool 150, the cutting resistance can be reduced.

Next, a third embodiment will be explained with reference to FIG. 19 to FIG. 22C. The third embodiment differs mainly in a point of an appearance configuration of the cutting insert from the second embodiment. Therefore in the following explanation in the third embodiment, characters corresponding to the characters used in the above explanation of the first and second embodiments are given to components corresponding to the components in the first and second embodiments.

A cutting insert 210 according to the third embodiment is formed in a substantially rhombic plate shape, and differs in this point from the cutting insert 110 according to the second embodiment. These embodiments are approximately in common in the other characteristics.

Specifically in the cutting insert 210 also, cutting portions 218 are formed at the intersection portion between each of end surfaces 212 and 214 and a peripheral surface 216. First corners 220 and second corners 222 are alternately arranged on each of the end surfaces 212 and 214. The first corner 220 has an internal corner angle α smaller than an internal corner angle β of the second corner 222 in the end surface view. Each cutting portion 218 extends between the second corners 222, and has a first cutting edge 218a and a second cutting edge 218b. Particularly the first cutting edge 218a has a portion extending to approach the median plane M as a distance from the first corner 220 increases. It should be noted that herein the cutting insert 210 is indexable, and the median plane M is perpendicular to a center axis B of a mounting hole 232.

In addition, the peripheral surface 216 is provided with two kinds of inclination side surfaces 216a and 216b, a first corner side surface 216c extending to connect the first corners 220 of both end surfaces and alternately arranged therebetween, and a second corner side surface 216d likewise extending to connect the second corners 222 of both end surfaces. In addition, on the first inclination side surface 216a, a first side surface portion 230a extending from the first cutting edge 218a related to the upper surface 212, and a second side surface portion 230b extending from the second cutting edge 218b related to the lower surface 214 are formed. On the second inclination side surface 216b, a second side surface portion 230b extending from the second cutting edge 218b related to the upper surface 212, and a first side surface portion 230a extending from the first cutting edge 218a related to the lower surface 214 are formed.

In addition, an inclination of each of the inclination side surfaces 216a and 216b of the peripheral surface 216 related to each of the cutting edges 218a and 218b is similar to an inclination of each of the inclination side surfaces 16a, 16b, 116a and 116b in the first and second embodiments. These inclination angles are within the angle range explained in the above first embodiment.

The cutting insert 210 and a boring tool 250 in which the cutting insert 210 is detachably mounted on an insert seat 253 of a tool body 252 by a screw 254 in the third embodiment can achieve the operation and the effect similar to those of the cutting insert 110 and the boring tool 150 in which the cutting insert 110 is detachably mounted in the second embodiment. As seen in FIGS. 21 and 22A-22C, the operative first cutting edge 218a' is at the forwardmost end of the boring tool 250 and the operative second cutting edge 218b' is counterclockwise therefrom, on the other side of the operative first corner 220'.

As described above, the three embodiments in the present inventions are explained, but other embodiments are also included in the present invention. For example, in the cutting insert of the first embodiment, the chip breaker is formed in a relatively simple shape. However, for example, the chip breaker may be formed in a three-dimensional complicated shape. In addition, it is possible to adopt various kinds of the existing known techniques, such as a provision of concavity and convexity on the flank surface as a nick. Further, in the first embodiment, the band-shaped surface having a narrow width, that is, the land is provided along the cutting edge. However, such a land is not necessarily required to be provided. The number of the insert seats formed in the tool body may be set to one or any number. In addition, in each of the above embodiments, the mounting hole is provided in the cutting insert, and the cutting insert is mounted on the tool body by the screw. However, the present invention allows a cutting insert with no mounting hole, and a cutting insert configured to be mounted on the tool body by various kinds of mechanical attachment means and a cutting tool on which the cutting insert is mounted can be included in the present invention.

The present invention is explained by the above-mentioned embodiments and their modifications with some degree of concreteness, but the present invention is not limited thereto. It should be understood that, with regard to the present invention, various alterations and changes may be made without departing from the spirits and scopes of the invention recited in the claims. That is, the present invention includes any variations, applications, and equivalents embraced by the concepts of the present invention defined by the claims.

What is claimed is:

1. A cutting insert comprising:
   two opposing end surfaces;
   a peripheral surface extending between the two end surfaces; and
   a peripheral edge formed at the intersection portion of each end surface and the peripheral surface, the peripheral edge including a plurality of cutting portions, each of the cutting portions including a first cutting edge and a second cutting edge; wherein
   in an end surface view of the cutting insert, first corners and second corners are alternately formed in each end surface, the first corner having an internal corner angle that is smaller than an internal corner angle of the second corner;
   each cutting portion is located between two adjacent second corners, and in each cutting portion, the first cutting edge and the second cutting edge extend from a common first corner in different directions;
   a median plane between the two end surfaces is defined so as to bisect the cutting insert;
   each first cutting edge has a portion extending so as to become closer to the median plane as a distance from a corresponding first corner increases;
   a first side surface portion extending on the peripheral surface from each first cutting edge has a portion forming an insert internal obtuse angle to a plane passing through the first cutting edge and parallel to the median plane; and
   a second side surface portion extending on the peripheral surface from each second cutting edge has a portion forming an insert internal acute angle to a plane passing through the second cutting edge and parallel to the median plane.

2. The cutting insert according to claim 1, wherein the insert internal acute angle is within the range which is 65° or larger and which is 88° or smaller.

3. The cutting insert according to claim 1, wherein the internal corner angle of the second corner is within the range which is 153° or larger and which is 179° or smaller.

4. The cutting insert according to claim 1, wherein the internal corner angle of the first corner is within the range which is 110° or larger and which is smaller than 135°.

5. The cutting insert according to claim 1, wherein in an end surface view of the cutting insert, a ratio of a length of the first cutting edge to a length of the second cutting edge is within a range from 4:1 to 5:2, including 4:1 and 5:2.

6. The cutting insert according to claim 5, wherein in the end surface view of the cutting insert, the ratio of the length of the first cutting edge to the length of the second cutting edge is approximately 3:1.

7. The cutting insert according to claim 1, wherein each first side surface portion related to a first end surface of the two end surfaces is on the same plane as a corresponding second side surface portion related to a second end surface of the two end surfaces.

8. The cutting insert according to claim 1, wherein in an end surface view of the cutting insert, each end surface has a substantially polygonal shape so as to be formed by ten or more even number sides.

9. The cutting insert according to claim 8, wherein a cross-sectional shape of the cutting insert in the median plane is a substantially regular decagon.

10. A cutting tool comprising:
a tool body; and
at least one insert seat formed in the tool body and having the cutting insert according to claim 1 mounted therein.

11. The cutting tool according to claim 10, wherein the cutting tool is a rotary cutting tool.

12. The cutting tool according to claim 10, wherein
in the cutting insert mounted on the tool body,
each of first and second end surface portions extending from operative first and second cutting edges on a related end surface acts as a rake surface, and
each of the first and second side surface portions extending from the operative first and second cutting edges acts as a flank surface.

13. The cutting tool according to claim 10, wherein
in the cutting insert mounted on the tool body,
an operative first cutting edge acts as a major cutting edge, and
an operative second cutting edge acts as a finishing edge.

* * * * *